Jan. 12, 1965

L. A. DE BOTTARI ETAL 3,165,647

RING COUNTER WITH NO FEEDBACK COMPRISING
SILICON CONTROLLED RECTIFIER STAGES

Filed June 20, 1962

INVENTORS.
LOUIS A. de BOTTARI
CIRO GUAJARDO
BY
Christie, Parker & Hale
ATTORNEYS.

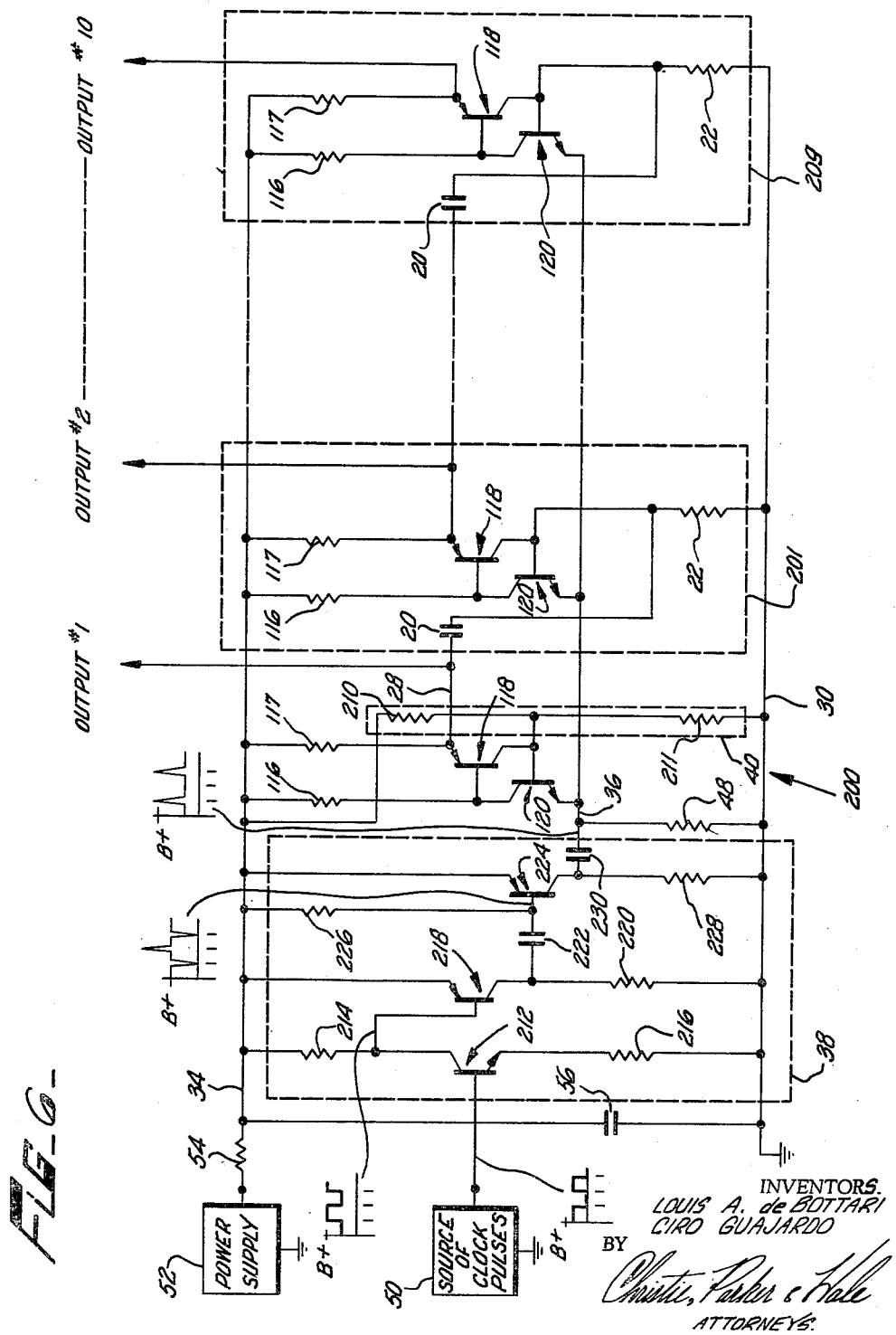

United States Patent Office 3,165,647
Patented Jan. 12, 1965

3,165,647
RING COUNTER WITH NO FEEDBACK COMPRISING SILICON CONTROLLED RECTIFIER STAGES
Louis A. de Bottari and Ciro Guajardo, Torrance, Calif., assignors to Alpha-Tronics Corporation, Torrance, Calif., a corporation of California
Filed June 20, 1962, Ser. No. 203,980
7 Claims. (Cl. 307—88.5)

This invention relates to electronic circuits and, more particularly, to improvements in electronic counting circuits.

Ring counters are generally known which contain a number of bi-stable devices connected in cascade. The output of the last bi-stable device in the cascade is coupled back to the input of the first, forming a closed loop. By way of example, one bi-stable device is in a true state, whereas all of the others are in a false state. The ring counter is connected to be responsive to input pulses for sequentially shifting the true state from one bi-stable device to the next. When the last bi-stable device in the cascade is in a true state, a signal is applied back to the input of the first so that the next input pulse triggers the first bi-stable device into a true state.

There are a number of disadvantages in the above prior art ring counter. For example, should more than one bi-stable device be triggered into a true state, by spurious electrical signals on the power supply lines or by other means, the true state of both bi-stable devices will subsequently shift around through the bi-stable devices of the counter causing ambiguous output signals. Another disadvantage is that a feedback circuit is required between the output of the last bi-stable device and the input of the first. The feedback circuit creates timing problems and requires extra components. Also, when power is first applied to the ring counter, there is no way to insure that the first bi-stable device will always be triggered into a true state unless extra components are added. Alternating current (A.C.) start circuits are used for triggering the first stage into a true state in response to the change in potential caused when power is first applied to the ring counter. However, extra components are needed specifically for the A.C. start circuit.

In contrast to the above prior art ring counters, the present invention provides an improved ring type of counter. In a specific counter embodying the present invention, the number of components are reduced by eliminating the need for both a feedback circuit and an A.C. start circuit. By reducing the number of components, the overall size of the counter is made small compared with other ring counters and the cost is minimized. Also, in the specific counter embodying the present invention, only one of the bi-stable devices can be in a conductive condition at a time. If more than one stage is in a conductive condition one is automatically switched into a non-conductive condition. Also, the power needed for operating the counter is greatly reduced over that required for the above prior art ring counter and the logic circuits needed for generating output signals from the counter is greatly reduced.

Briefly, a specific embodiment of the present invention provides: A counter having a plurality of switching devices connected in cascade including first and last switching devices. Each of the switching devices have input, output and control electrodes and are characterized as having stable conductive and non-conductive states. A separate circuit is connected between the input electrode of each switching device except the last switching device and the control electrode of the next switching device in the cascade. A common impedance element is connected in series with the output electrode of each switching device and a switching circuit is connected for applying electrical signals across the common impedance element and the input electrode of each switching device. A voltage divider circuit is provided for applying a constant reference potential to the control electrode of the first switching device.

Other aspects of the present invention may be more fully understood with reference to the following description of the figures of which:

FIG. 6 is a schematic diagram of a counter employing an alternate switching circuit and the bi-stable devices of FIG. 5 and embodying the present invention.

Figure 1:
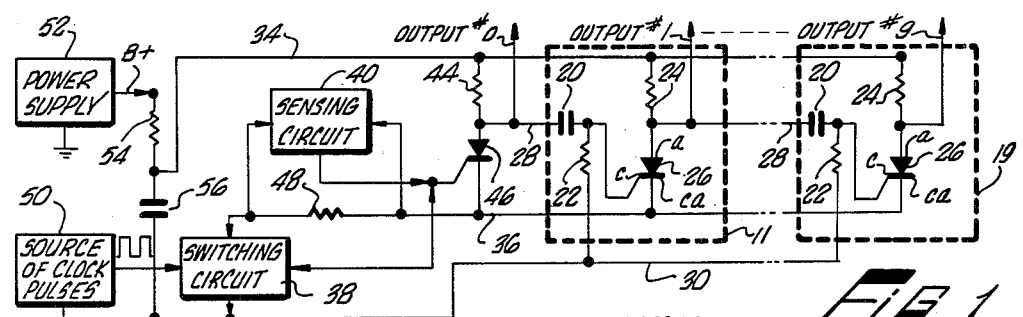
FIG. 1 is a schematic diagram, with parts shown in block diagram, of a counter which embodies the present invention.

Refer now to FIG. 1 which shows a schematic diagram, partly in block diagram, of a counter which embodies the present invention. The counter of FIG. 1 includes nine identical stages represented by the symbols 11 through 19, stages 12 through 18 not being shown.

Stage 11 includes a capacitor 20, resistors 22 and 24 and a silicon controlled rectifier 26. A silicon controlled rectifier is hereinafter referred to as an SCR element. The capacitor 20 and the resistor 22 are connected in series between an input line 28 for stage 11 and a line 30, which is connected to ground (0 volts potential). The resistor 24 and the SCR element 26 are connected in series between a power supply line 34 and a common line 36. The SCR element 26 is poled with its anode and cathode electrodes, connected to one end of the resistor 24 and the common line 36, respectively and thereby forms a bi-stable circuit. The bi-stable circuit may be considered as having a control circuit at the control electrode of the SCR element 26 and an output circuit at the anode and cathode electrodes of the SCR elements 26. The bi-stable circuit may also be considered as having an input circuit at the line 34 side of resistor 24 at which power is applied. The control electrode of the SCR element 26 is connected to the junction formed by the capacitor 20 and the resistor 22. The output circuit of stage 11 is at the junction of the resistor 24 and the anode electrode of the SCR element 26 and is connected to the input line 28 of the subsequent stage 12 (not shown) of the counter. Each of the other stages 12 through 19 are identical to the stage 11, identical elements being referenced by the same reference numbers as stage 11, and are connected in cascade with the output of a stage connected to the input circuit of the subsequent stage of the counter.

In contrast to prior art ring counters which provide a feedback circuit between the output of the last stage and the input of the first stage, the counter of FIG. 1 includes a special direct current (D.C.) start circuit. The D.C. start circuit includes a switching circuit 38, a sensing circuit 40 and a common load resistor 48. Also provided is a separate first stage in the counter including a resistor 44 and an SCR element 46, connected in series similar to the resistor 24 and SCR element 26 of stage 11. In contrast to the SCR element 26, which has its control electrode connected to the capacitor 20 and resistor 22, the control electrode of the SCR element 46 is connected to the output circuit of the sensing circuit 40. The common load resistor 48 has one end connected to the common line 36 and the other end connected to the input of the switching circuit 38. A source of clock pulses 50 applies positive pulses to the switching circuit 38. The switching circuit 38 also has a control circuit connected to the sensing circuit 40.

A power supply 52 which develops a positive voltage output signal is provided with its output circuit, represented by the symbol B+, connected to the input of a conventional power supply filter circuit. The power supply filter circuit includes a resistor 54 and a capacitor 56 connected in series between the output circuit B+ of the power supply 52 and ground. The junction of the resistor 54 and the capacitor 56 is connected to the power supply line 34.

With the circuit arrangement of the counter shown in the schematic diagram of FIG. 1 in mind, refer to its operation.

The SCR elements are PNPN semi-conductor devices having conductive characteristics similar to that of a thyratron tube. The SCR elements may be triggered into a stable conductive state either by applying a small positive potential signal on the control electrode with respect to the cathode electrode or by applying a sufficiently large forward or positive voltage signal between its cathode and anode electrodes. In the counter circuits of FIGS. 1, 2 and 3, a positive potential applied at the control electrode is used to switch the SCR element into conduction rather than increasing the voltage between its anode and cathode electrodes. FIG. 4 shows the typical conductive characteristics of an SCR element. As indicated in FIG. 4, once an SCR element is switched into a conductive state, a very small anode to cathode current, $I_h$, is needed to sustain the element in conduction. The SCR element is switched into a stable non-conductive state by decreasing the current through the anode to cathode electrodes below the sustaining current $I_h$. Once the SCR element is switched into a non-conductive state, it remains in non-conduction until a positive signal is again applied at its control electrode.

Assume now that the power supply 52 is switched on and applies an electrical potential on the power supply line 34. The power supply filter, including elements 54 and 56, prevent transients on the power supply line 34 which may cause more than one SCR element to be switched into a conductive state. In addition, the power supply filter is arranged with a time constant which is very much longer than that of the elements including the resistor 24, capacitor 20 and resistor 22. The resistor 44 has the same impedance value as the resistor 24. Therefore, after the power supply 52 is turned on, the potential on the power supply line 34 increases slowly and the current in the capacitor 20 of each stage 11 through 19 is negligible. The negligible current flow through the capacitors 20 of each stage allow the potential at the control electrode of the SCR elements 26 of stages 11 through 19 to be biased essentially at ground potential through the resistors 22. Also, when the potential on the power supply line 34 increases sufficiently, the switching circuit 38 connects the common load resistor 48 to ground. Since both the control and cathode electrodes of the SCR elements 26 of stages 11 through 19 are essentially at ground potential they remain in a non-conductive condition. The sensing circuit 40 is responsive to the lack of current, or negligible current flow, through the common resistor 48 to apply a positive signal at the control electrode of the SCR element 46 with respect to its cathode electrode, switching it into a stable conductive state. Therefore, current flows from the power supply line 34 to ground via resistor 44, SCR element 46, resistor 48, and switching circuit 38.

While the SCR element 46 is in a conductive condition the capacitors 20 in each of the stages 11 through 19 start charging due to current flow from the power supply line 34 to ground via resistors 44 and 22. Assume that the source of clock pulses 50 does not immediately start developing clock pulses. The capacitor 20 in each of the stages other than stage 11, i.e., stages 12 through 19, charge until a steady state condition is reached. In a steady state condition the capacitors 20 in the stages 12 through 19 are charged with a voltage differential across the plates equal to that from the power supply line 34 to ground. This charged condition will be referred to as a "fully charged" condition.

However, the SCR element 46 of the first stage is in a conductive state causing the potential at the input line 28 side of capacitor 20 of stage 11 to be slightly above ground level. In contrast to stages 12 through 19, the capacitor 20 of stage 11 charges to a steady state condition wherein a small charge is stored thereacross due to the small potential at the anode electrode of SCR element 46 with respect to ground and the connection to ground through resistor 22. The charged condition of capacitor 20 of stage 11 wherein a small charge is stored thereon at steady state is referred to as a "partially charged" condition.

Assume now that the capacitors 20 are all charged to a steady state condition and a clock pulse is applied to the switching circuit 38. The clock pulses cause the switching circuit 38 to disconnect the resistor 48 from ground and current in the SCR element 46 drops below the sustaining current causing it to switch into a non-conductive condition. Shortly thereafter, the switching circuit 38 reconnects resistor 48 to ground. The SCR element 46 is in a non-conductive state and the resistor 48 is connected to ground, therefore, the anode electrode of SCR element 46 rises to a potential essentially equal to that at the power supply line 34. Since the capacitor 20 of stage 11 is in a "partially charged" condition, a positive potential is applied at the control electrode of SCR element 26 of stage 11 with respect to its cathode electrode and it is switched into a conductive state. However, the capacitors 20 of stages 12 through 19 are in a "fully charged" condition, therefore, the signal applied at the control electrode of the corresponding SCR elements 26 is negligible and the SCR elements 26 remain in non-conduction.

The next clock pulse causes the switching circuit 38 to switch the SCR element 26 of stage 12 into a non-conductive state and the SCR element of stage 13 is switched into a conductive state in a similar fashion as described for the first stage and stage 11.

Assume now that the SCR element 26 of stage 19 is in a conductive condition. The capacitors 20 in each of the stages 11 through 19 will be in a "fully charged" condition. The succeeding clock pulse from the source of clock pulses 50 causes the switching circuit 30 to disconnect the common load resistor 48 from ground, and the SCR element 26 of stage 19 is switched into a non-conductive state. The switching circuit 38 subsequently connects the common load resistor 48 back to ground. However, the capacitors 20 in each of the stages 12 through 19 are in a "fully charged" condition and none of the SCR elements 26 are switched into a conductive state. Similar to the operation when the power supply 52 is turned on, all SCR elements 26 are now in a non-conductive state. Therefore, the current through resistor 48 is essentially zero. This causes the sensing circuit 40 to apply a positive potential signal at the control electrode of the SCR element 46, switching it into a conductive state again.

The switching circuit 38 and the sensing circuit 40 are also arranged so that whenever more than one of the stages are in a conductive state, the counter is automatically reset so that only the first stage is in a conductive condition. Assuming that SCR elements of two stages are in a conductive condition, the sensing element 40 senses this condition by the increased potential across resistor 48 and applies a control signal to the switching circuit 38. The switching circuit 38 is responsive to a control signal to immediately disconnect the common load resistor 48 from ground. The switch 38 does not reconnect the resistor 48 to ground until the capacitors 20 in all of the stages 12 through 19 have had time to re-charge via resistors 44 and 22 to a "fully charged" condition. When the switch 38 subsequently reconnects the common resistor 48 to ground, none of the SCR elements of stages 12 through 19 are switched into a conductive state. The sensing circuit 40 senses the negligible current flow in resistor 48 and applies a positive signal to the control electrode of SCR element 46 switching it into a conductive state.

The conductive state of the first stage and stages 11 through 19 represent the state of the counter. Only a single stage is in conduction at any one instant of time, therefore, the stage in a conductive state represents the state of the counter. The conductive state of the stages are represented by the signal at the anode electrodes of the SCR elements. When the signal at an anode electrode is at a low potential, as opposed to a potential equal to the potential at the power supply line 34, the corresponding stage is in a conductive state. Accordingly, the counter of FIG. 1 has outputs referenced as outputs #0 through #9 connected to the anode electrodes of the SCR elements of the first stage and stages 11 through 19, respectively.

Figure 2:
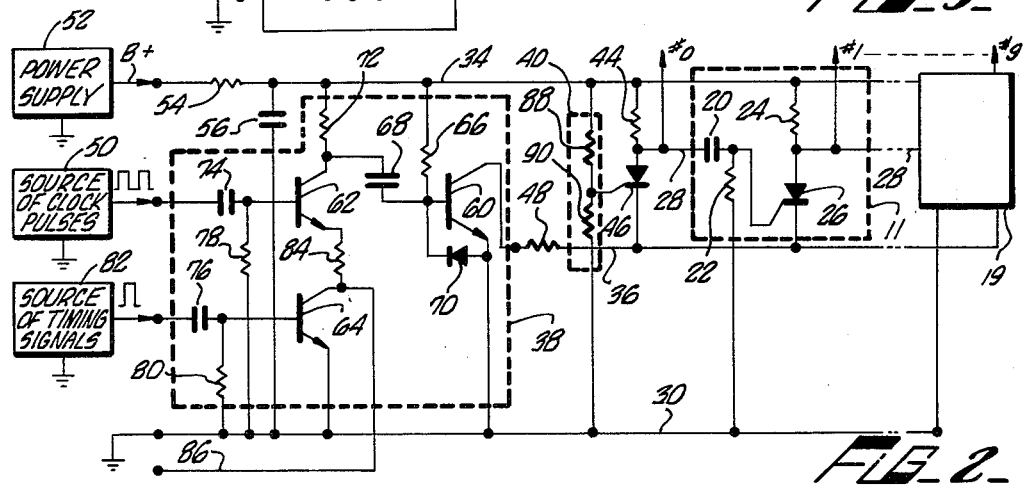
FIG. 2 is a schematic diagram of a counter showing the details of portions shown in block diagram of FIG. 1 and embodies the present invention.

With the counter of FIG. 1 in mind, refer now to the counter shown in the schematic diagram of FIG. 2 which embodies the present invention. The counter of FIG. 2 is similar to the counter of FIG. 1, except that the details of the sensing circuit 40 and the switching circuit 38 are shown. Thus, the counter of FIG. 2 includes stages 11 through 19, each of which has resistors 22 and 24, a capacitor 20 and an SCR element 26. Also, the counter of FIG. 2 includes a first stage including an SCR element 46 and a resistor 44 and a power supply filter circuit. Similar to FIG. 1, the cathode electrodes of each of the SCR elements are connected in common to one end of a common load resistor 48.

Refer now to the switching circuit 38. The switching circuit 38 includes NPN transistors 60, 62 and 64. The NPN transistor 60 has its collector electrode connected in series with the common load resistor 48 and its base electrode connected in common to a resistor 66, a coupling capacitor 68 and the cathode of a semiconductor diode 70. The anode electrode of the diode 70 and the emitter electrode of the transistor 60 are connected in common to ground. The other ends of the capacitor 68 and the resistor 66 from transistor 60 are connected to the collector electrode of the transistor 62 and the power supply line 34. The junction of the collector electrode of the transistor 62 and capacitor 68 is connected through a resistor 72 to the power supply line 34. The base electrodes of the transistors 62 and 64 are connected to the output of differentiating circuits, including capacitors 74 and 76 and resistors 78 and 80. The capacitor 76 is connected between the base electrode of the transistor 64 and the output circuit of a source of timing signals 82. The capacitor 74 is connected between the base electrode of the transistor 62 and the output circuit of the source of clock pulses 22. The resistors 78 and 80 are connected between the base electrodes of transistors 62 and 64 and ground. The emitter and collector electrodes of the transistors 62 and 64 respectively, are connected together in series by a resistor 84. The junction of the collector electrode of transistor 64 and resistor 84 is connected to a shorting line 86.

Refer now to the sensing circuit 40 of FIG. 2. The sensing circuit 40 is a voltage divider circuit comprising resistors 88 and 90 connected in series between the power supply line 34 and ground. The junction of resistors 88 and 90 is connected to the control electrode of the SCR element 46.

Table I shows the typical values for the indicated elements of FIG. 2.

*Table I*

| Elements | Values | Elements | Values |
|---|---|---|---|
| 20 | .01 microfarad. | 68 | .01 microfarad. |
| 22 | 2.2×10³ ohms. | 72 | 1×10³ ohms. |
| 24 | 1×10³ ohms. | 74 | .01 microfarad. |
| 44 | 1×10³ ohms. | 76 | .05 microfarad. |
| 48 | 100 ohms. | 78 | 47×10³ ohms. |
| 54 | 33 ohms. | 80 | 1×10³ ohms. |
| 56 | 22 microfarads. | 84 | 270 ohms. |
| 66 | 10×10³ ohms. | | |

With the details of the counting circuit shown in the schematic diagram of FIG. 2 in mind, refer now to its operation. Assume that the power supply 52 is turned on. As the potential on the line 34 rises, current starts flowing through the resistor 66 to the base electrode of the transistor 60, biasing it into a conductive condition. When in a conductive condition the transistor 60 connects the common load resistor 48 to ground. Since none of the SCR elements of stages 12 through 19 are switched into a conductive condition, the current in the common load resistor 48 is essentially equal to 0. The relative values of resistance of the voltage divider resistors 88 and 90 and the common load resistor 48 are such that a positive voltage signal is applied at the control electrode of SCR element 46 of sufficient magnitude with respect to the voltage signal at its cathode electrode that the SCR element 46 is switched into a conductive condition.

Assume now that while the SCR element 46 is in a conductive state the source of clock pulses 50 develops a positive output pulse. Prior to the clock pulse resistors 78 and 80 bias the base electrodes of the transistors 62 and 64 to ground and keep the transistors in a nonconductive condition. However, the capacitor 74 differentiates the leading edge of the clock pulse and applies a positive voltage signal at the base electrode of the transistor 62 with respect to its emitter electrode. This tends to switch the transistor 62 into a conductive condition. However, the source of timing signals 82 is not developing an output signal, therefore, the resistor 80 maintains the base electrode of the transistor 64 at ground potential and the transisor 64 remains in a non-conductive condition. Similarly, a positive pulse applied to the capacitor 76 by the source of timing signals 88 in the absence of a pulse from the source of clock pulses 50, switches the transistor 64 into a conductive condition, however, transistor 62 remains in a non-conductive condition. Thus, the transistors 62 and 64 and associated circuits form an "and" gate and only apply a change in signal to the capacitor 68 when a positive pulse is applied simultaneously to both the capacitors 74 and 76.

Assume now that the source of clock pulses 50 and the source of timing signals 82 simultaneously develop positive output pulses. The capacitors 74 and 76 couple the rise in potential to the base electrodes of the transistors 62 and 64, switching them into conductive conditions. This causes the potential at the collector electrode of the transistors 62 to drop towards ground. The capacitor 68 couples the drop in potential at the collector electrode of transistor 62 to the base electrode of the transistor 60. The drop in potential is sufficient that the transistor 60 is switched into a non-conductive condition and the resistor 48 is disconnected from ground. This causes the SCR element 46 to be switched into a nonconductive condition similar to that described in connection with FIG. 1. The diode 20 prevents excessive reverse bias voltages across the emitter to base electrodes of the transistor 60. The time constant for discharge of capacitor 68 is much greater than the time constant for the charging of capacitors 74 and 76. The time constant for charging capacitors 74 and 76 is also less than the time lapse during a clock pulse. Thus, the capacitors 74 and 76 charge, the transistors 62 and 64 switch into a non-conductive condition and a positive voltage signal is coupled through the capacitor 68 to the base electrode of the transistor 60. The positive signal at the base electrode of the transistor 60 switches it into a conductive condition and the resistor 48 is coupled back to ground. The operation of the stages in the counter is identical to that described in connection with FIG. 1.

If only a single input is to be used and the source of timing signals 82 is not to be used for controlling the counting of the counter of FIG. 2, the shorting line 86 is connected to ground. When the shorting line 86 is connected to ground, each time the source of clock pulses 50 develops a positive output pulse, the transistor 62 is switched into a conductive condition, causing transistor 60 to be switched into a non-conductive condition, thereby, causing SCR elements in the counter of FIG. 2 to be switched into a non-conductive condition.

The sensing circuit 40 and the switching circuit 38 of FIG. 2 do not have the ability to immediately switch all of the stages into a non-conductive condition should more than one stage be triggered into conduction. However, should two stages be triggered into conduction the conductive condition of both stages will be transferred to the succeeding stages in the counter. Since there is no feedback from the last stage 19 to the first stage the conductive state of the two stages will be counted out of stage 19 and then when all stages are in a non-conductive condition the sensing circuit 40 including the resistors 88 and 90 and the common load resistor 48 apply a voltage signal between the cathode and control electrodes of the SCR element 46 of sufficient magnitude to switch it into a conductive condition. Thus, after a maximum of one cycle of counts through the counter of FIG. 2 only one SCR element will be in a conductive state.

Figure 3:
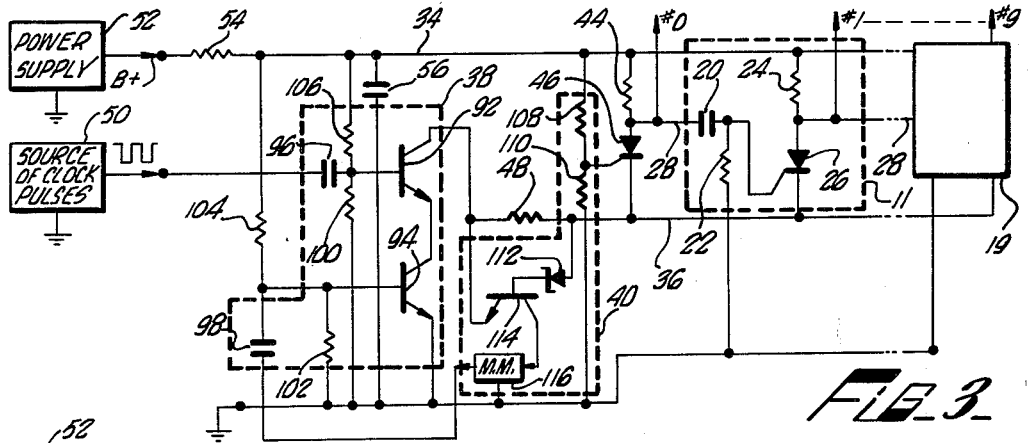
FIG. 3 is a schematic diagram of a counter showing an alternate arrangement for portions shown in block diagram in FIG. 1 and embodies the present invention.
Figure 4:
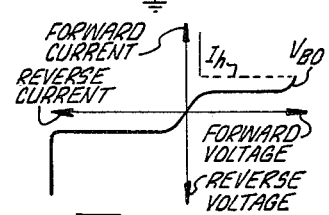
FIG. 4 shows a sketch of typical conductive characteristics for bi-stable devices for use in the counters of FIGS. 1, 2 and 3.

With the counter of FIG. 2 in mind, refer now to the schematic diagram of FIG. 3 showing a counter having an alternate D.C. start circuit arrangement and which embodies the present invention. The counting circuit shown in FIG. 3 is identical to that shown in FIG. 1 except that the details of the start circuit and specifically the sensing circuit 40 and the switching circuit 38 are shown. The switching circuit 38 for the counter shown in FIG. 3 includes transistors 92 and 94. Also included in the switching circuit 38 are differentiating circuits including capacitors 96 and 98 and resistors 100 and 102. The capacitor 96 and the resistor 100 are connected in series between the output of a source of clock pulses 115 and ground. The junction of the capacitor 96 and resistor 100 is connected to the base electrode of the transistor 92. The capacitor 98 and the resistor 102 are connected in series between the output of the sensing circuit 40 and ground. The junction of capacitor 98 and resistor 102 is connected to the base electrode of the transistor 94. The base electrodes of transistors 92 and 94 are connected through resistors 106 and 104 to the power supply line 34.

The sensing circuit 40 includes voltage divider resistors 108 and 110 which are connected in series between the power supply line 34 and ground. The junction of the resistors 108 and 110 is connected to the control electrode of the SCR element 46. Also included in the sensing circuit 40 is a semiconductor diode 112, an NPN transistor 114 and a monostable multivibrator 116. The base electrode of the transistor 114 is connected through the cathode to anode electrodes of the diode 112 to the common line 36. The emitter electrode of the transistor 114 and the collector electrode of the transistor 92 are connected in common to the common load resistor 48. The output circuit of the monostable multivibrator 116 is connected to the capacitor 98.

Refer now to the operation of the counter of FIG. 3. Assume that the power supply 52 is initially turned on. Similar to the resistors 88 and 90 of the sensing circuit 40 of FIG. 2, the resistors 108 and 110, bias the control electrode of the SCR element 96 positive with respect to its cathode electrode. The resistors 106 and 104 apply positive voltage signals at the base electrodes of transistors 92 and 94 with respect to the emitter electrodes. Thus, transistors 92 and 94 are biased into a conductive condition, resistor 48 is connected to ground and the SCR element 46 is switched into conduction.

Contrasted with the source of clock pulses 50 of FIGS. 1 and 2, the source of clock pulses 115 of FIG. 3 develops negative output pulses rather than positive output pulses. Each time the source of clock pulses 115 applies a negative pulse to the capacitor 96, the transistor 92 is biased into a non-conductive condition until the capacitor 96 charges. Each time transistor 92 switches into a non-conductive condition, the common load resistor 48 is disconnected from ground, causing the operation of the stages of the counter to be similar to that described in connection with FIG. 1.

Assume now that somehow two stages of the counter are switched into a conductive condition. The current through the common load resistor 48 will be twice the current supplied by one conductive SCR element. The diode 112 has a forward voltage drop greater than that developed by the common load resistor 48 when one SCR element is in a conductive condition but less than that developed across the common load resistor 48 when two SCR elements are in a conductive condition simultaneously. Thus, with two SCR elements in a conductive condition, the voltage drop developed across the common load resistor 48 forward biases the diode 112 and causes the diode 112 to apply a positive voltage signal at the base electrode of the transistor 114 with respect to its emitter electrode and biases it into a conductive condition. With the transistor 114 in a conductive condition the input circuit of monostable multivibrator is coupled through the transistors 114, 92 and 94 to ground. When ground potential is applied to the input circuit of monostable multivibrator 116, a negative output pulse is applied thereby through the capacitor 98 to the base electrode of the transistor 94. The negative signal at the base electrode of the transistor 94 causes transistor 94 to switch into a non-conductive condition and disconnect the common load resistor 48 from ground. The negative signal developed by the monostable multivibrator 116 and the time constant of the capacitor 98 and resistor 102 are adjusted such that the transistor 94 is held in a non-conductive condition long enough for all of the capacitors of the stages 11 through 19 to become "fully charged." Thus, when transistor 94 is switched back into a conductive condition, the only SCR element switched into a conductive condition is the SCR element 46.

Figure 5:
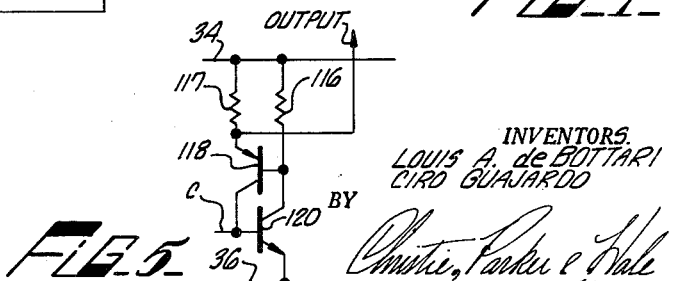
FIG. 5 is an alternate example of a bi-stable device for use in the counting circuits of FIGS. 1, 2 and 3.

Although the circuits of FIGS. 1, 2 and 3 have been described using SCR elements as bi-stable devices, other devices having similar characteristics as that illustrated by the diagram of FIG. 4 may be used. For example, two complementary transistors, an NPN and a PNP transistor, and associated resistors connected as shown in FIG. 5, may be substituted for the SCR elements 26 and resistors 24 of stages 11 through 19 and the SCR element 46 and resistor 44 of FIGS. 1, 2 and 3. FIG. 5 shows a PNP transistor 118 and an NPN transistor 120. The emitter electrode of the PNP transistor 118 is connected through a load resistor 117 to the power supply line 34. The base and collector electrodes of the transistor 118 are connected to the collector and base electrodes, respectively, of transistor 120. The emitter electrode of transistor 120 is connected to the common line 36. The base electrode of the transistor 118 is connected through a biasing resistor 116 to the power supply line 34. The base electrode of the transistor 120 corresponds to the control electrode of the SCR elements of FIGS. 1, 2 and 3. The emitter electrode of the transistor 118 corresponds to the output circuit at the anode electrodes of the SCR elements of FIGS. 1, 2 and 3.

Assume the complementary transistor circuit shown in FIG. 5 is in a non-conductive condition, negligible current flows therethrough between the power supply line 34 and the ground line 30. When a small positive base current is applied to the transistor 120, current will flow through its collector to emitter electrodes. This curent supplies base current to the transistor 118 and forces the transistor 118 into a conductive condition. As the transistor 118 starts conducting it applies more base current to the transistor 120, driving it further into a conductive condition. Thus, the complementary transistor circuit of FIG. 5 becomes a self-regenerative circuit and increases current flow through the transistor 120 until current is finally limited by the circuit impedances. When the current is stabilized, the complementary transistor circuit is in a stable conductive condition and remains in a conductive condition until the emitter electrode of transistor 120 is disconnected from ground. It has been found that a counter employing the complementary transistor circuit arrangement of FIG. 5 may be operated at repetition rates in excess of twice that possible with the present commercially available SCR elements.

Refer now to the counter of FIG. 6. The counter of FIG. 6 is similar to the counter of FIG. 2 except for the switching circuit 38 and bistable stages 200 through 209 wherein the complementary transistor arrangement shown in FIG. 5 is used rather than SCR elements.

The stage 200 is the first stage of the counter and corresponds to the first stage of FIG. 2. The circuit arrangement of the sensing circuit 40 of FIG. 6 and its operation is identical to that of FIG. 2 and has voltage divider resistors 210 and 211.

The base electrode of the transistor 120 and the collector electrode of the transistor 118 of stage 200 are connected together to the junction of the voltage divider resistors 210 and 211 of the sensing circuit 40. In contrast to the counter of FIG. 2, which has a common load resistor 48 connected in series with a switch the common load resistor 48 of FIG. 6 is connected between the common line 36, connected to the emitter electrodes of each of the transistors 120, and the ground line 30 and switching is provided in parallel with the common load resistor 48 rather than in series.

Refer now to the details of the switching circuit 38 shown in FIG. 6. A filter identical to that shown in FIGS. 1 through 3 is connected to the output of the power supply 52. The output circuit of a source of clock pulses 50 is connected to a transistor amplifier including an NPN transistor 212, a PNP transistor 218 and load resistors 214, 216 and 220. The load resistor 214 is connected in series between the power supply line 34 and the collector electrode of the transistor 212. The load resistor 216 is connected in series between the emitter electrode of the transistor 212 and the ground line 30.

The collector electrode of the transistor 212 is connected to the base electrode of the transistor 218. The transistor 218 has its emitter and collector electrodes connected to the power supply line 34, and an end of the load resistor 220, respectively. The other end of the load resistor 220 is connected to the ground line 30. The collector electrode of the transistor 218 is serially connected through a capacitor 222 to the input of another amplifier including a PNP transistor 224, a bias resistor 226 and a load resistor 228. The bias resistor 226 is connected between the power supply line 34 and a junction formed by the capacitor 222 and the base electrode of the transistor 224. The transistor 224 has its emitter and collector electrodes connected to the power supply line 34, and an end of the load resistor 228. The other end of the load resistor 228 is connected to the ground line 30. A capacitor 230 is connected between the collector electrode of the transistor 224 and the common line 36.

The switching circuit 38 is connected in parallel with the common load resistor 48 and in addition is D.C. isolated by means of the capacitor 230. Such an arrangement is important and has an advantage over the series switching arrangement of FIG. 2 in that only passive elements are connected in series between the common line 36 and the ground line 30. In applications wherein counters are subjected to wide variations in temperature a series active element such as a transistor tends to change its output current and voltage with temperature. As the voltage across the transistor 60 increases, current through the conductive stage of the counter of FIG. 2 tends to decrease, thereby, creating an unreliable operating condition. In contrast, the active elements of the switching circuit 38 of FIG. 6 are isolated from the common line 36. The current in the conductive stage of the counter of FIG. 6 is dependent only on the passive resistor element 48. The common resistor 48 may be selected to have a low resistance variation with temperature change.

Refer now to the operation of the switching circuit of FIG. 6. Assume that initially the input signal applied to the transistor 212 by the source of clock pulses 50 is at a high potential level, biasing the transistor 212 into a conductive condition. With the transistor 212 in a conductive condition, a bias signal is applied to the transistor 218 biasing it into a conductive condition. With the transistor 218 in a conductive condition, the signal at the collector electrode thereof is at a high potential level essentially equal to that on the power supply line 34. Assume the capacitor 222 is in a steady state charged condition. The bias resistor 226 biases the transistor 224 into a non-conductive condition. Also, assume that the stage 200 is in a conductive condition and the capacitor 230 has charged to a steady state condition. A voltage drop is developed across the common load resistor 48 preventing other stages of the counter of FIG. 6 from being switched into a conductive condition as described hereinabove.

Assume now, that the output signal of the source of clock pulses 50 drops to ground potential. The drop in signal at the base electrode of the transistor 212 is sufficient to switch it into a non-conductive condition, causing the signal at the collector electrode thereof to rise to a potential essentially equal to that on the power supply line 34. The rise in signal reverse biases the base emitter electrode circuit of the transistor 218 biasing it into a non-conductive condition. When the transistor 218 is biased into a non-conductive condition, the signal at its collector electrode drops essentially to ground potential. The drop in signal at the collector electrode of the transistor 218 is differentiated by the capacitor 222, causing a drop in potential at the base electrode of the transistor 224, varying essentially between the potential on the power supply line 34 and ground potential. The drop in signal is differentiated and applied at the base electrode of the transistor 224 by the capacitor 222 momentarily biasing the transistor 224 into a conductive condition. When the transistor 224 is biased into a conductive condition, the potential at the collector electrode thereof rises to a potential essentially equal to that on the power supply line 34. The capacitor 230 differentiates the rise in signal caused by the transistor 224 and the resulting signal is applied to the common line 36. The rise in signal on the common line 36 causes the conductive stage 200 to be biased into a non-conductive condition as described hereinabove and the next stage 201 biased into a conductive condition after capacitor 230 charges and the signal on the common line 36 drops back to the electrical signal existing before the rise in signal applied by the transistor 224. When the output signal of the source of clock pulses 50 subsequently rises back to a high potential level, the transistors 212 and 218 are switched back into a conductive condition causing a rise in potential to be applied at the base electrode of the transistor 224. However, previous to the rise in potential at the output of the source of clock pulses 50, the capacitor 222 charged to a quiescent condition, thereby allowing the resistor 226 to again bias the transistor 224 into a non-conductive condition. Therefore, the rise in potential at the base electrode of the transistor 224 does not affect the conductive condition thereof.

What is claimed is:

1. A counter comprising a plurality of switching elements connected in cascade, including first and last switching elements, each of said switching elements comprising input, output and control electrodes, a load impedance for each of said switching elements and connected for applying an electrical signal to the input electrode thereof, a voltage divider circuit connected for applying a constant bias potential to the control electrode of said first switching element, a separate capacitive element for each switching element other than said last switching element and connected between the input electrode of the corresponding switching element and the control electrode of the succeeding switching element in the cascade, an impedance element for each of said capacitive elements and connected for separately applying an electrical signal to the common junction of the capacitive element and the connected control electrode, a two terminal load impedance having one terminal connected in common to the output electrode of each of said switching elements, and a transistor switching circuit connected to the other terminal of the common impedance element for applying an electrical reference potential thereto.

2. A counter comprising a plurality of switching elements connected in cascade, including first and last switching elements, each of said switching elements having input, output and control electrodes and characterized as having conductive characteristics substantially the same as a thyratron tube, a separate load impedance connected for applying an electrical signal to the input electrode of each switching element, a voltage divider circuit connected for applying a bias potential to the control electrode of said first switching element, a separate capacitive element connected to be responsive to the change from a conductive to a non-conductive condition of each switching element except said last switching element for applying a signal to the control electrode of the succeeding switching element in the cascade of sufficient magnitude for switching same into a conductive condition, a separate impedance element coupled to each of said capacitive elements for limiting the time the control signal is applied to said control electrodes, a load impedance having at least two terminals and having one terminal connected in common to the output electrode of said switching elements, and a transistor switching circuit connected to the other terminal of said common impedance element for applying and removing a reference signal thereto for sequentially switching said switching elements into and out of conductive conditions.

3. A counter comprising a plurality of silicon controlled rectifier elements connected in cascade, including first and last silicon controlled rectifier elements, each of said silicon controlled rectifier elements having input, output and control electrodes, a separate load empedance connected for applying an electrical signal to the input electrode of each silicon controlled rectifier element, a voltage divider circuit connected for applying a bias potential to the control electrode of said first silicon controlled rectifier element, a separate capacitive element connected to be responsive to the change from a conductive to a non-conductive condition of each silicon control rectifier element for applying a control signal to the control electrode of the succeeding silicon controlled rectifier element in the cascade of sufficient magnitude for switching same into a conductive condition, a separate impedance element connected to each of said capacitive elements for limiting the time the control signal is applied to the control electrodes, a common load impedance having at least two terminals and one of the terminals connected in common to the output electrode of each silicon controlled rectifier element, and a transistor switching circuit connected to the other terminal of said common impedance element for applying and removing a reference signal thereto for sequentially switching said silicon controlled rectifier elements into and out of conductive conditions.

4. A counter as defined in claim 3 wherein said transistor switching circuit comprises a pair of transistor elements having power circuits connected in series and a separate transistor element having a control electrode connected to the power circuit of one of said pair of transistor elements and a power circuit connected in series with said common impedance element.

5. A counting circuit comprising a plurality of switching circuits connected in cascade, including first and last switching circuits, each switching circuit comprising a pair of transistor elements, each transistor having a control circuit and a power circuit, the two transistors of each switching circuit being interconnected with the power circuit of one transistor element connected to the control circuit of the other, a separate load impedance connected to the power circuit of a first one of said transistors for applying an electrical signal thereto, means connected to the control circuit of said first transistor element in each of said switching circuits for applying a bias signal thereto, power supply means connected to the last-named means and to the power circuit of the other transistor, means connected to the power circuit of the first transistor and to the control circuit of the second transistor and responsive to a change in conductive state of each switching circuit other than said last switching circuit for applying a signal to the control circuit of the second transistor in the succeeding switching circuit, an impedance element connected in series with a power circuit of the first transistor element in each switching circuit, and switching means connected for applying an electrical signal to the series load impedance.

6. In a ring counter including a plurality of silicon controlled rectifier elements connected in cascade, each of the rectifier elements comprising input, output and control electrodes, a separate load impedance element connected for applying an electrical signal to the input electrode of each rectifier element, separate means connected to the control electrode of each respective rectifier element and to be responsive to the conductive condition of each rectifier element except the last one in the cascade for applying a signal to the control electrode of the said succeeding rectifier element, a load impedance connected in series with the output electrode of each rectifier element the improvement comprising the combination of a separate silicon controlled rectifier having input, output and control electrodes, the control electrode thereof being connected in series with the series load impedance, means for applying a bias signal to the control electrode of said separate silicon controlled rectifier, and switching means coupled in series with said impedance element for applying an electrical reference signal thereto.

7. A counter comprising a plurality of switching circuits connected in cascade including first and last switching circuits, each of said switching circuits including output and control circuits and characterized as being responsive to signals applied between the control and output circuit thereof for switching into first and second conductive states, and each of said switching circuits except one normally being switched into the first state thereof, separate storage means connected to be individually responsive to a change from the second to the first state of each switching circuit other than said last switching circuit for applying a signal to the control circuit of the succeeding switching circuit in the cascade for causing same to be switched into the second state thereof, an impedance means serially coupled in common to the output circuit of each of said switching circuits for receiving the output current therefrom, switching means connected to be responsive to an applied signal for applying an electrical signal in parallel with said impedance means for switching the one switching circuit not in the first state into said first state, and a voltage divider circuit connected for cooperating with said impedance means for applying a bias signal between the control and output circuits of said first switching circuit for switching same into the second state thereof in response to the first conductive state of each of the other switching circuits.

References Cited in the file of this patent

Pulse and Digital Circuits, by Millman & Taub, FIG. 5-17, page 165, Copyright 1956, by McGraw-Hill Book Co., Inc.

Solid State Products, Inc., Bulletin D410-02 3-60 "Applications and Circuit Design Notes," page 12, Fig. 10.